H. P. T. MATTE.
SURVEYING TELESCOPE.
APPLICATION FILED MAR. 11, 1913.
1,149,668.
Patented Aug. 10, 1915.
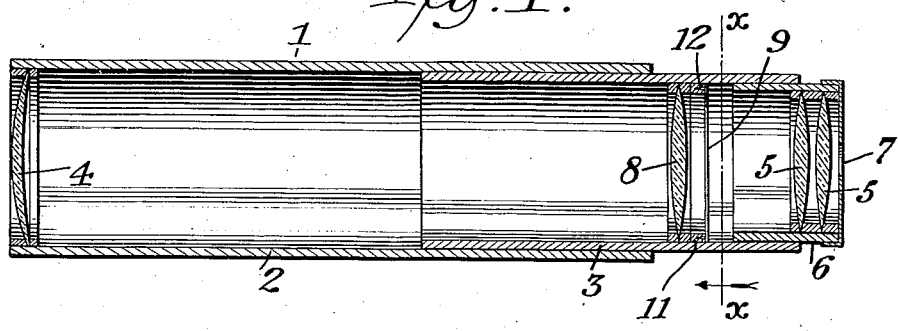
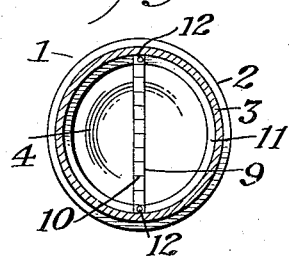
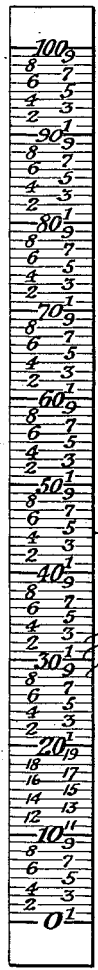
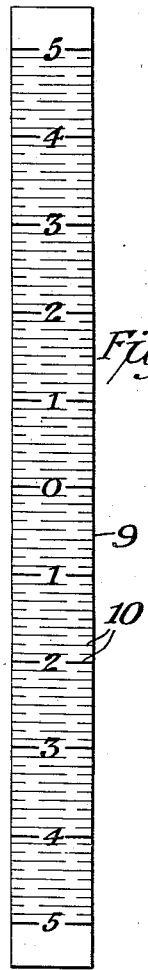
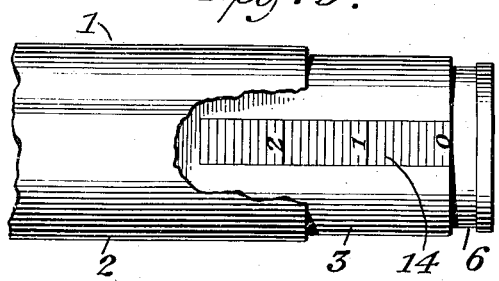
Witnesses:
A. R. Appleman
Madeline Roentichte
Inventor
Hubert P. T. Matte
By his Attorney

UNITED STATES PATENT OFFICE.

HUBERT P. T. MATTE, OF NEW YORK, N. Y.

SURVEYING-TELESCOPE.

1,149,668.

Specification of Letters Patent.   Patented Aug. 10, 1915.

Application filed March 11, 1913. Serial No. 753,486.

*To all whom it may concern:*

Be it known that I, HUBERT P. T. MATTE, a citizen of the United States, and resident of Richmond Hill, borough of Queens, in the city of New York, county of Queens, State of New York, have invented certain new and useful Improvements in Surveying-Telescopes, of which the following is a specification.

This invention relates to telescopes, and it has particular relation to engineer's telescopes such as are employed in surveying and analogous operations.

The object of my invention is to provide an improved telescope which will afford greater accuracy and convenience in use, which will facilitate all classes of work for which it is adapted, such as reconnaissance, preliminary surveys, etc., and which will furthermore possess advantages in point of simplicity, adaptability to various conditions of use, and general efficiency.

In the drawings—Figure 1 is a longitudinal sectional view of a surveying telescope embodying my improvements. Fig. 2 is a transverse sectional view on the line $x$—$x$, Fig. 1. Fig. 3 is a detail face view, on an enlarged scale of the transparent scale-strip shown in Fig. 2, illustrating one preferred arrangement of the graduations thereon. Fig. 4 is a detail view corresponding to Fig. 3 and illustrating a modification in the arrangement of the graduations on the transparent scale-strip. Fig. 5 is a side view of part of the telescope body, partly broken away.

Corresponding parts in all the figures are denoted by the same reference characters.

Referring to the drawings, 1 designates the body of the telescope, which is in the main of any usual or adapted construction, comprising relatively slidable tubes or sections, as at 2—3, the main section 2 carrying the objective lens, shown at 4, and the eye-piece section 3 carrying the eye-piece set of lenses. The eye-piece set of lenses may be arranged in any suitable or adapted number, and I have herein shown two of such lenses, 5—5, carried by the eye-piece proper, 6, immediately in front of the sight opening, shown at 7, of the eye-piece section, and supplementary lens, 8, carried within the section 3 a short distance in front of said pair of lenses 5—5.

In my invention, a transparent graduated scale, as at 9, is arranged in the line of vision through the lenses, and is constituted by a narrow strip of suitable transparent material upon which are marked suitable graduations, shown at 10. The transparent graduated scale-strip 9 is arranged within and transversely of the eye-piece section 3 of the body of the telescope, in the focal plane of the optical elements and with its graduated scale corresponding in extent to the visual extent of the strip. This transparent scale-strip is located in front of and adjacent to the initial eye-piece lenses, and it may be mounted in fixed position in any suitable or adapted manner.

In the preferred construction, as herein shown, the body section 3 of the telescope is provided with an internal annular sleeve or flange, 11, secured to the inner shell wall of the section 3, and the ends of the scale-strip 9 are respectively secured in connection with the edge of said flange, as at 12, adhesively, or by means of suitable pins if desired, whereby the scale-strip 9 is securely fixed in position so that it extends centrally across the focal plane of the optical elements and intersects the line of vision therethrough. In the relative arrangement of the transparent graduated scale-strip 9, when three eye-piece lenses are employed in an inverting telescope, as herein shown, the scale-strip is arranged intermediately between the initial lenses 5—5 and the supplementary lens 8, it being thus in front of the lenses 5—5 and back of the lens 8, and its position is preferably closer to the lens 8 than to the initial lenses 5—5, as shown in Fig. 1.

The graduated scale-strip may be formed of any suitable transparent material upon which the graduations are adapted to be marked, but in practice I prefer to form the strip of a sensitive transparent film upon which the graduations are produced by contact printing after the scale has been reduced to the desired size by photographing from an original scale of larger dimensions. The graduations upon the transparent scale may be as desired or adapted for the particular work or conditions under which the telescope is to be employed. For instance, I have herein illustrated, in Fig. 3, the employment of a scale graduated to $\frac{1}{1000}$ of a foot, the scale-strip being $\frac{1}{10}$ of a foot long and the divisions of the graduations being numbered consecutively from 0 to 100, thus making each division of the scale $\frac{1}{1000}$ of a foot. Under some circumstances of practice, when the instrument is employed with relation to a fixed size of object, the scale can be graduated to read directly in feet by arranging the zero mark (0) in the center and numbering the graduations consecutively in both directions away from 0, as shown in Fig. 4.

Under operative conditions, to enhance accuracy in the solution of any problem for which the improved telescope is employed, I provide a scale externally upon the side of the telescope, for use in conjunction with the transparent graduated scale which is carried internally and intersects the line of vision through the lenses. This external scale may be arranged or provided in any suitable or adapted manner, but in the preferred construction, as herein shown, one of the slidable tubes or sections, 3, of the telescope body is provided, upon its external surface and in a longitudinal plane, with a series of graduations, shown at 14, marked, for instance, in inches and divisions thereof, which external graduated scale will indicate, under the slidable adjustment of the tubes or sections of the telescope body, the distance from the objective lens 4 to the internal transparent scale-strip 9.

While I have herein described the internal graduated scale-strip 9 as being transparent, it will be understood that under some circumstances of use a translucent strip will serve the required operative conditions, and therefore the term transparent is herein intended to be used synonymously with the term translucent in contradistinction to an opaque scale-strip.

The operation and advantages of my invention and improvements will be readily understood by those skilled in the art to which they appertain.

The primary object of my invention is to provide an improved telescopic hand instrument which will facilitate reconnaissance, preliminary surveys, etc., which will afford greater convenience and accuracy in surveying operations, and which can be effectively and accurately used without a tripod or rest.

With my improved telescopic instrument, in surveying operations a graduated rod can be dispensed with, and the absence of this as well as of a bulky transit enables greater convenience in transportation and use and greater facility in surveying, the operator being unhampered by a heavy or complicated equipment.

While my improved telescopic device is designed primarily for accurate work as a hand instrument, it will of course be understood that, if desired, it can be employed with accuracy by resting it upon any suitable or convenient stationary object or in connection with any suitable mounting. It will also be understood that my improvements are not confined to their adaptable use in relation to an ordinary inverting telescope for surveying operations, but that the invention is also adapted for effective operation and employment in connection with all classes of telescopes and all uses in which such instruments are generally operative.

In the practical employment of my improved telescopic instrument, to find the constant for the instrument, a series of readings are observed from known distances, and, by means of the formula $$\frac{I}{O} = \frac{f_1}{f_2},$$

the unknown distances $f_2$ can be computed and the ratio between the actual distance and the computed distance can be obtained. In the formula just stated $f_1$ and $f_2$ designate the distances of the strip 9 and the object, respectively, from the plane of the objective lens or the conjugate foci thereof, and I and O designate respectively the image and the object. It will be understood that the operator can readily ascertain the curves showing the intercepts at various heights of objects at different distances.

The improved telescope can be conveniently and effectively employed to read heights, when the distance is known, and the accuracy to which heights can be read increases with the approach of the object to the objective lens.

In general operation, the accuracy of the improved telescope increases in ratio to the focal length of the objective lens. For instance, I have found in practice that, with a focal length of 6″, an accuracy approximating 1 foot in 100 feet may be attained in sighting an object of 4 feet dimensions, the general rule being that the accuracy increases with the shortening of the distance and the lengthening of the object.

In the solution of any problem, tables can be made or the slide rule, constituted by the external scale 14, may be advantageously used, especially when the improved telescope is of long focal length, under which circumstances, with the external scale at the side of the telescope, $f_1$ can be observed and a more accurate solution can be obtained. Likewise $f_2$ can be found with the external scale 14. It will be noted that a vernier can be attached, with relation to the external scale 14, to facilitate the operative use of the instrument, as will be readily understood.

Upon the foregoing description, it will be understood that the improved construction under my invention comprises a transparent graduated scale in the field of vision and located in the eye-piece in the focal plane of the objective, in combination with an external scale on the longitudinal plane of the telescope body (with an attached vernier, if desired), to enable the operator to read and determine the distance between the scale and the optical center of the objective. With this relative combination as hereinabove described, in the use of the instrument the size of the object sighted is determined by observing the number of divisions included on the transparent scale by the image of the object, and then the external longitudinal scale is read and the two variables thus obtained are substituted in a formula, as will be readily understood. The function of the external scale is to measure the variation in distance between the objective and the transparent scale, which occurs when objects at varying distances are sighted, the conditions being that the nearer the object the greater the distance between the objective and the scale. Thus, with the improved instrument, the size of an object at an unknown distance can be measured with accuracy, or the distance between two points in the same plane perpendicular to the line of vision through the telescope and at a distance therefrom can be easily determined without actually measuring the distance between the telescope and said points; also, the height of a distant object can be measured, and the distance between that object and the telescope can be ascertained, without actually leaving the point of view.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In a telescope having relatively adjustable objective and ocular elements, a transparent graduated scale interposed in the line of vision through the lenses and in the focal plane of the optical elements, and an external scale in the longitudinal plane of the instrument and operative to indicate the adjustment between the objective lens and said transparent graduated scale.

2. A telescope comprising relatively adjustable objective and ocular elements and having a transparent graduated scale interposed in the line of vision through the lenses, and provided with an external scale graduated in the longitudinal plane of the side of the ocular tube of the telescope body and operative to indicate the adjustment between the objective lens and said transparent graduated scale.

3. A telescope comprising relatively slidable objective and ocular tubes or sections and having a transparent graduated scale interposed in the line of vision through the lenses, and provided with an external graduated scale at the side of the ocular tube or section.

4. A telescope comprising relatively slidable objective and ocular tubes or sections and having a transparent graduated scale interposed in the line of vision through the lenses, and in the focal plane of the optical elements, and provided with an external scale graduated in the longitudinal plane of the side of one of said relatively slidable sections.

5. A telescope comprising relatively adjustable objective and ocular elements and having a transparent graduated scale interposed in the line of vision through the lenses, and provided with a supplementary graduated scale for indicating the adjusted distance from the objective lens to said transparent graduated scale.

6. A telescope comprising relatively adjustable objective and ocular elements and having a graduated scale interposed in the line of vision through the lenses and in the focal plane of the optical elements and provided with a supplementary graduated scale for indicating the adjustment of said first mentioned scale with relation to the objective lens.

7. A telescope comprising relatively slidable objective and ocular elements and having a fixed graduated scale interposed in the line of vision through the lenses and in the focal plane of the optical elements, and having an external scale in the longitudinal plane of one of the slidable sections of the instrument.

In testimony whereof, I have signed my name in the presence of the subscribing witnesses.

HUBERT P. T. MATTE.

Witnesses:
 Jos. REED LITTELL,
 MADELINE ROSENLICHT.